Feb. 14, 1950

A. F. SANDERS 2,497,802

FUEL INJECTION ENGINE

Filed Feb. 20, 1947

INVENTOR.
Arthur F. Sanders
BY
Mawhinney & Mawhinney
Attorneys

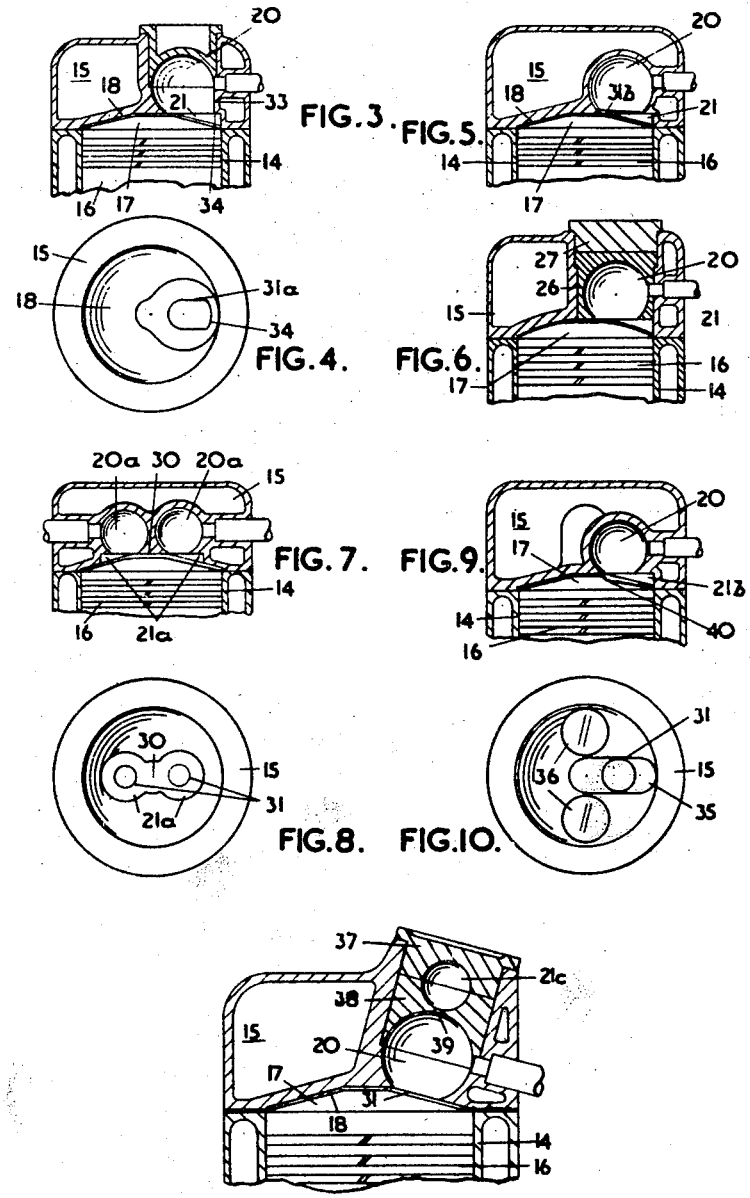

Patented Feb. 14, 1950

2,497,802

UNITED STATES PATENT OFFICE 2,497,802

FUEL INJECTION ENGINE

Arthur Freeman Sanders, Penzance, England

Application February 20, 1947, Serial No. 729,710
In Great Britain March 9, 1946

5 Claims. (Cl. 123—33)

This invention relates to a fuel-injection engine, and particularly to one which operates with compression ignition. Furthermore, the invention is particularly concerned with a two-stroke cycle engine, but it is not limited in this respect.

In the specification of my British Patent No. 440,046 (corresponding to United States Patent No. 2,089,577, filed June 26, 1935) there is disclosed a fuel-injection engine with a compact combustion chamber wholly or mainly in the cylinder head with its centre more or less in line with the side wall of the cylinder bore, the arrangement being such that a swirl will be set up in one direction in the combustion chamber when the piston begins its compression stroke, the direction or character of the swirl changing as the piston completes its compression stroke, at which moment fuel-injection takes place—with a result that very intimate mixing of fuel and air takes place and combustion is very complete.

In the specification of my British Patent No. 531,075 (corresponding to United States Patent No. 2,296,192, filed July 1, 1940) a rather similar arrangement is shown, but in this there is a reception cavity and an injection cavity associated with one another and with the cylinder bore in such a manner as to give desirable combustion results, the injection cavity again having its centre substantially in line with one side of the cylinder bore, except in the construction of Figure 3 of the drawings in which the injection cavity has its centre substantially coaxial with the piston, the reception cavity in this figure being provided in the piston head and offset laterally with respect to the injection cavity.

In the specification of my British Patent No. 514,380 (corresponding to United States Patent No. 2,195,709, filed April 17, 1939) there is disclosed the use of two separate injection cavities into which injection can take place successively, and in the specification of my British Patent No. 556,000 (corresponding to United States Patent No. 2,379,190, filed March 10, 1943) the outlet opening between the injection cavity and the cylinder bore is one which is wedge-shaped in cross-sectional view in order to provide certain advantages as mentioned in that specification.

But in the main it is an essential feature of all these prior arrangements that the injection cavity should have its centre lying substantially on a continuation of the side wall of the cylinder bore.

In certain conditions, however, it is an advantage to have the combustion chamber wholly inside the space bounded by a continuation of the internal wall of the cylinder, and it is my main object to provide an engine having this feature and incorporating some or all of the advantages of engines as disclosed in the prior specifications.

A fuel-injection engine, according to the invention, has a piston reciprocable within a cylinder, the pressure end of the piston being convex towards the cylinder head whilst the adjacent face of the latter is, mainly or entirely, similarly concave. It also has a compact injection cavity, into which fuel-injection takes place, which is in the cylinder head within the space bounded by a continuation of the internal wall of the cylinder but is offset from the axis of the cylinder, and which communicates with the cylinder bore through a ductless opening which is wholly or mainly sharp-edged and is of a cross-sectional area which is less than the maximum cross-sectional area of the injection cavity in a parallel plane. It also has a reception cavity which is of less volume than the injection cavity and which is in direct communication with the injection cavity during the whole of the piston stroke.

The term "dustless opening" is used herein to mean an opening which has no directional effect on fluid passing through it.

Preferably the injection cavity is part-spherical, the said dustless opening being a circular one. Alternatively, the said ductless opening may be a substantially D-shaped one, the shape of the injection cavity then being altered from the part-spherical by the provision of a flat or part-cylindrical wall substantially in the plane of the flat or almost flat edge of the D-shaped opening.

The reception cavity is preferably wholly within the space bounded by a continuation of the internal wall of the cylinder, and is bounded by a wall of the cylinder head in which the said ductless opening is, also by a wall curved about an axis which is parallel to the cylinder axis, and also by part of the convex end of the piston when at the adjacent head-centre position. Alternatively, the reception cavity may be part-spherical and wholly within the cylinder head, communicating directly with the injection cavity but not directly with the cylinder bore.

As a modification use may be made of two or more such coacting injection and reception cavities angularly spaced from one another.

In the accompanying drawings:

Figure 3 is a sectional elevation similar to the view of Figure 1 but showing a modification, Figure 3 being to a smaller scale;

Figure 4 is an underside plan of the cylinder head of Figure 3; and

Figures 5, 6, 7, 9 and 11 are all sectional elevations, similar to that of Figure 3, of different embodiments according to the invention, Figure 8 being an underside plan of the cylinder head of Figure 7, and Figure 10 an underside plan of the cylinder head of Figure 9.

Like reference numerals are used throughout the various figures to indicate similar parts.

In all the constructions there is a cylinder 14 the end of which is closed by a cylinder head 15 and in the bore of which reciprocates a piston 16. The head 17 of the piston is convex, being of frusto-conical form in Figures 1, 3, 4, 5, 9 and 11. The cylinder head is shaped, as indicated at 18, to be in the main of a corresponding concavity.

Whilst the drawings show the invention as applied to a single cylinder engine, this is merely for simplicity of illustration.

Figure 1:
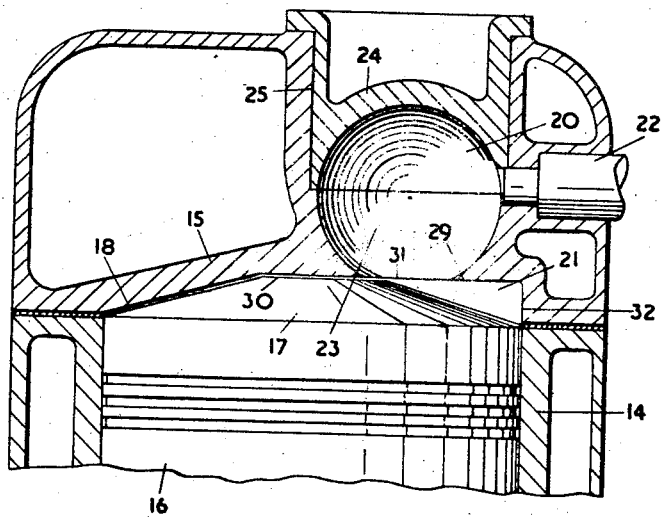
Figure 1 is a sectional elevation, mainly of the cylinder head, of a fuel-injection engine according to the invention.

In Figure 1 the combustion chamber comprises a part-spherical injection cavity 20 and a reception cavity 21, fuel being injected into the former by means of a fuel injector 22. The centre of the injection cavity 20 is offset from the axis of the cylinder; but the whole of the injection cavity is within the space bounded by a continuance of the internal wall of the cylinder.

Figure 1 shows the injection cavity as being provided partly by a portion 23 which is integral with the cylinder head and partly by a plug 24 adapted to be secured in an opening 25 of the cylinder head in any well-known manner. Obviously, if desired, the injection cavity can be formed entirely in the metal of the cylinder head, as shown, for example, in the construction of Figure 5; or, if preferred, it could be formed entirely in a detachable plug such as that indicated at 26 in Figure 6, the plug being retained in position in any well-known manner by means of a cap 27.

The reception cavity 21 is formed, in Figure 1, in the cylinder head, the concave truncated conical surface 18 of the latter having a flat 29 of circular outline machined therein, the flat 29 merging at the centre of the piston with a flat 30 corresponding to that at the centre of the piston head. Thus, the reception cavity is bounded, at the top-dead-centre position of the piston, by the wall 32 which is part-cylindrical about an axis parallel to that of the cylinder axis, by the flat wall 29, and by the adjacent portion 17 of the piston head.

The injection chamber communicates with the reception cavity, and with the cylinder bore, through a sharp-edged, ductless opening 31, which, as shown, is circular.

Figure 2:
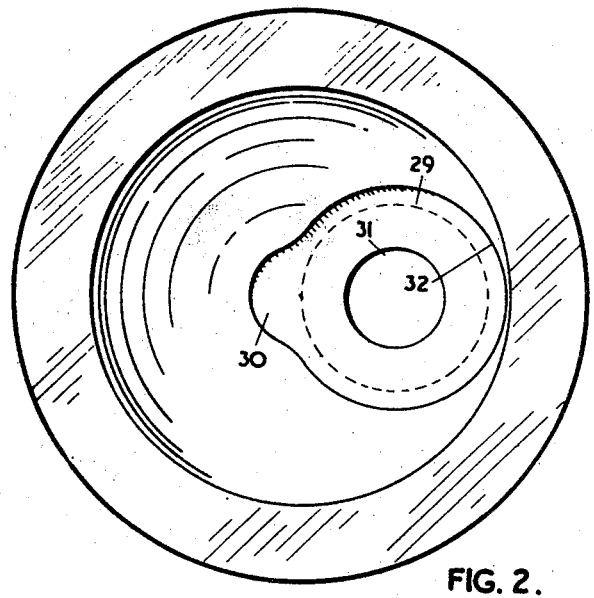
Figure 2 is an underside plan of the cylinder head.

The modification of Figures 3 and 4 differs from that of Figures 1 and 2 mainly in that the sharp-edged, ductless opening 31a is in this case substantially of D-shape, the injection cavity having a part-cylindrical surface 33 machined in it to align with the corresponding edge 34 of the opening.

The construction of Figure 5 differs from that of Figure 1 mainly in that the circular, ductless opening 31b is in this case wedge-shaped in cross-section.

The modification introduced by Figure 6 is that the piston head 17 is part-spherical, with a flat at the centre, the face 18 of the cylinder head being similarly concave (except for the reception cavity 41), and in other respects this construction is in substance the same as that of Figures 1 and 2.

In Figures 7 and 8 there are shown two injection cavities 20a each associated with its own reception cavity 21a. In addition, in this example the reception cavities do not extend away from the axis of the cylinder as far as the continuance of the side walls of the cylinder bore, as is the case in the constructions of Figures 1, 3, 5, and 6, for the reason that the centre of each injection chamber 20a is nearer the cylinder axis than is the centre of the injection cavity 20. The two reception chambers 21a are, it will be observed from Figure 8, united with one another by the intermediate flat 30, as viewed in Figure 8.

Figure 9 shows a modification of Figure 1 in which the cylinder head is to carry a pair of valves, the reception cavity 21b being in this case elongated, instead of being circular as shown in Figures 2 and 4. That is to say, a flat 35 of oval outline is machined in the concave face 18 of the cylinder head. The valves are indicated at 36. The piston head may have a slight recess 40 provided in it adjacent the reception cavity.

In the construction of Figure 11 the reception cavity 21c is of spherical form and disposed entirely in the cylinder head, being provided by two blocks 37, 38, of which the latter provides part of the injection cavity 20. The two cavities are again directly joined with one another by an opening 39, the injection cavity communicating directly with the cylinder bore through a sharp-edged, ductless opening 31.

In this latter example the piston head 17 at the appropriate dead-centre position approaches the concave face 18 of the cylinder head with the minimum of clearance, necessary for mechanical reasons, throughout the whole of its area. It does so in the constructions of Figures 1, 3, 5, 6, 7 and 9, except for the space occupied by the reception cavity.

What I claim as my invention and desire to secure by Letters Patent of the United States is:

1. A fuel-injection engine having a fuel injector, a cylinder, a cylinder head closing one end of said cylinder, a piston reciprocable within said cylinder, the pressure end of said piston being convex towards said cylinder head whilst the adjacent face of the latter is in the main complementarily concave, said cylinder head having in it a compact injection cavity into which fuel injection takes place from said injector, said cylinder head having in its said adjacent face a recess of wedge-shaped cross-section in a radial plane containing the cylinder axis and with the thin end of the wedge directed towards the latter, said recess and a part of the convex head of the piston, when the latter is in its adjacent dead centre position, defining a reception cavity which is of less volume than the injection cavity and of which the said part of the piston head forms a boundary wall, the injection and reception cavities lying between a continuation of the internal wall of the cylinder and the longitudinal axis of the latter, and the said cavities communicating with each other through a ductless opening which is mainly sharp-edged and which is of a cross-sectional area which is less than the maximum cross-sectional area of said injection cavity in a parallel plane.

2. A fuel-injection engine, according to claim 1, in which said injection cavity is part-spherical, and said ductless opening is a circular one.

3. A fuel-injection engine, according to claim 1, in which said ductless opening is a substantially D-shaped one, and the injection cavity is part-spherical except for the provision of a flat wall substantially in the plane of the flat edge of the D-shaped opening.

4. A fuel-injection engine, according to claim 1, in which the radially-outer wall of said reception cavity is formed by a wall curved about an axis which is parallel to the cylinder axis.

5. A fuel-injection engine, according to claim 1, in which there are two or more of such coacting injection and reception cavities angularly spaced from one another.

ARTHUR FREEMAN SANDERS.

REFERENCES CITED

The following references are of record in the file of this patent:

UNITED STATES PATENTS

| Number | Name | Date |
|---|---|---|
| 2,189,082 | Pope, Jr. | Feb. 6, 1940 |
| 2,195,709 | Sanders | Apr. 2, 1940 |
| 2,379,190 | Sanders | June 26, 1945 |
| 2,393,872 | Sanders | June 29, 1946 |

FOREIGN PATENTS

| Number | Country | Date |
|---|---|---|
| 401,024 | Great Britain | May 24, 1933 |
| 749,891 | France | Aug. 1, 1933 |